United States Patent
Takahashi

(10) Patent No.: US 6,246,486 B1
(45) Date of Patent: Jun. 12, 2001

(54) INFORMATION PROCESSING APPARATUS, INFORMATION PROCESSING METHOD, AND INFORMATION PROCESSING SYSTEM

(75) Inventor: Yoshinori Takahashi, Tokyo (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/782,817

(22) Filed: Jan. 13, 1997

(30) Foreign Application Priority Data

Jan. 18, 1996 (JP) .................................. 8-023488

(51) Int. Cl.[7] ...................................... G06F 15/00
(52) U.S. Cl. ........................................ 358/1.13; 358/1.15
(58) Field of Search ..................... 395/114, 112, 395/113, 115, 117, 101, 500, 527, 385, 828, 830, 831, 834, 835, 836–839, 882, 883, 884, 200.33, 200.39, 200.5, 200.51, 200.54, 200.6, 200.67; 400/61–65, 76, 67, 70–71; 358/407, 467, 468

(56) References Cited

U.S. PATENT DOCUMENTS 5,031,115 * 7/1991 Hayashi ................... 395/101
5,228,118 * 7/1993 Sasaki ...................... 395/112
5,353,388 * 10/1994 Motoyama ................ 395/117
5,580,177 * 12/1996 Gase et al. ................ 395/114

FOREIGN PATENT DOCUMENTS 61-125663 * 6/1986 (JP) .

* cited by examiner

Primary Examiner—Dov Popovici
(74) Attorney, Agent, or Firm—Fitzpatrick, Cella, Harper & Scinto

(57) ABSTRACT

A system includes an information processing apparatus connected to a network to which are also connected a plurality of printers and a server apparatus provided with a print queue, the server apparatus being one of a print server and a file server. The apparatus makes a first query to a first one of the plurality of printers concerning a printer language supported by the first printer and, when a first response identifying a printer language supported by the first printer in response to the first query is received, transmits to the first printer print data converted to be interpretable by the printer language identified by the first response. On the other hand, when the first response is not received, the apparatus makes a second query to the remaining ones of the plurality of printers other than the first printer concerning what printer languages are supported by the remaining printers, and instruction unit provides an instruction to select one of the remaining printers based on a second response received from at least one of the remaining printers in response to the second query.

92 Claims, 7 Drawing Sheets

INFORMATION PROCESSING APPARATUS, INFORMATION PROCESSING METHOD, AND INFORMATION PROCESSING SYSTEM

BACKGROUND OF THE INVENTION

1. Field of the Invention

The present invention relates to printer control performed in a network to which a plurality of printers are connected.

2. Related Background Art

Hitherto, printer control is performed in a network to which a plurality of printers are connected in such a manner that a network printer which is to perform a printing operation and a corresponding printer driver for converting print data received from an application program to a printer language are independently selected.

However, the above known type of printer control presents the following problems. If the printer language of a network printer which is to perform a printing operation does not match the printer language of the selected printer driver, the print data converted according to the printer language which does not fit the network printer is disadvantageously sent to the printer, thus causing incorrect character conversion, which prevents a correct printing operation. Further, if a network printer is newly connected to a network, it is necessary that a corresponding new printer driver be installed in each of the client computers on the network.

SUMMARY OF THE INVENTION

Accordingly, in view of the above-described background, it is an object of the present invention to achieve correct printing operations performed while printer languages for individual printers connected to a network are transparent to the user and also to eliminate the need for installing a printer driver into a client computer when a printer is newly connected to a network.

Further objects, features and advantages of the present invention will become apparent from the following description of the preferred embodiments with reference to the attached drawings.

DESCRIPTION OF THE PREFERRED EMBODIMENTS

[First Embodiment]

Embodiments of the present invention will now be described with reference to the drawings.

Figure 1:
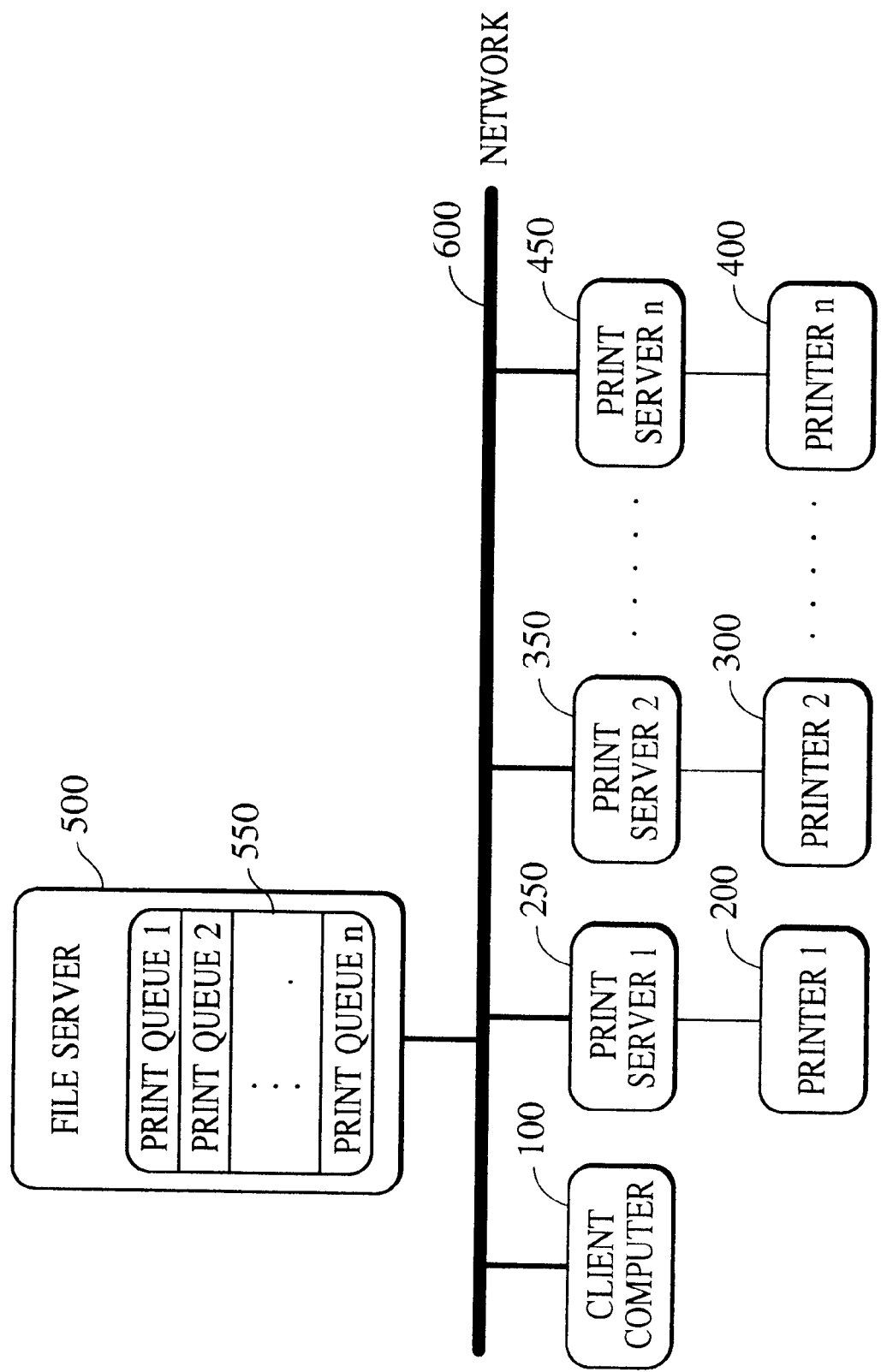
FIG. 1 is a block diagram of the system configuration by the application of a network print system according to first, second and third embodiments of the present invention.

FIG. 1 is a block diagram of a system configuration formed by the application of a network print system according to first, second and third embodiments of the present invention. It will now be assumed in FIG. 1 that n-number of printers and n-number of print servers are connected to a network 600. Printers 200, 300 and 400 are respectively connected to corresponding print servers 250, 350 and 450 by means of printer cables via interfaces (not shown), and convert print data received from the print servers 250, 350 and 450 to dot image data per page to print it page by page.

A client computer 100 is connected to the network 600 by a network cable via an interface (not shown). The client computer 100 is capable of running various programs, such as application programs, and is loaded with a printer driver which serves the function of sending to the network 600 a print job represented by the printer language corresponding to the printer selected to print the data. The printer driver is adapted to support a plurality of printer languages.

A file server 500, which is a computer loaded with a network operating system (OS), is connected to the network 600 by a network cable via an interface (unillustrated) so as to store files used in the network 600 and monitor the use of the network 600. The filer server 500 also contains print queues 550 for temporarily storing print jobs sent to the individual printers 200, 300 and 400. The number of the print queues 550 corresponds to the number of the printers connected to the network 600. The print servers 250, 350 and 450, which are connected to the network 600 by a network cable via an interface (unillustrated) and are also connected to the printers 200, 300 and 400 by printer cables via interfaces (not shown), sequentially send print job data to the corresponding printers 200, 300 and 400 if there are any print jobs stored in the associated print queues 550.

In this manner, according to the first through third embodiments, the functions are shared by the client computer 100, the print servers 250, 350 and 450, and the file server 500. This enhances the effective use of the client computer 100 and speeds up printing operations.

Figure 2:
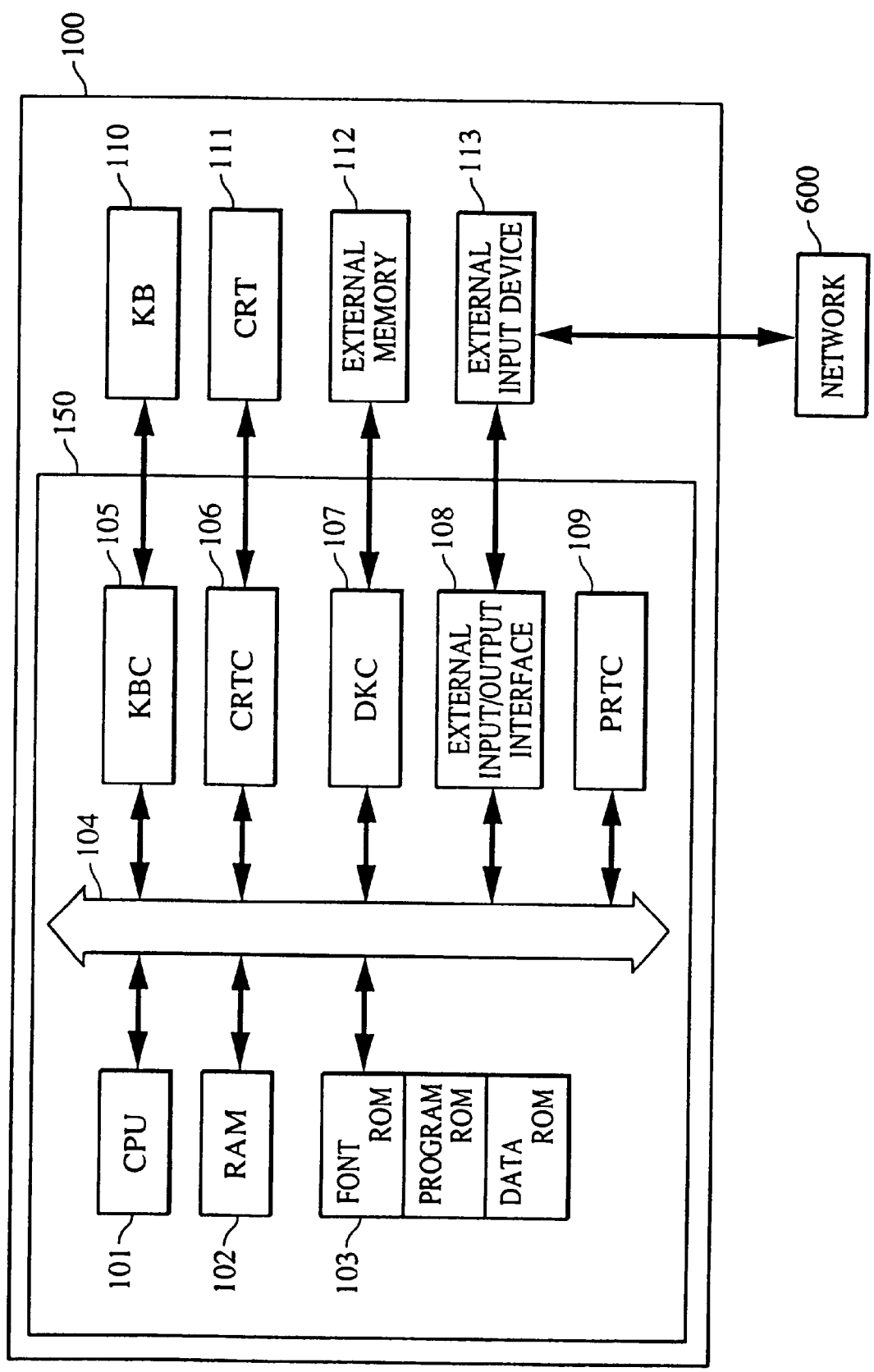
FIG. 2 is a block diagram illustrating the schematic configuration of the client computer shown in FIG. 1.

FIG. 2 is a block diagram illustrating the schematic configuration of the client computer 100. A central processing unit (CPU) 101 runs programs, such as application programs and printer driver programs, stored in an external memory 112, for example, a hard disk (HD) or a floppy disk (FD), connected to a disk controller (DKC) 107 so as to temporarily store in a RAM 102 information and files required for running the programs. The CPU 101 also controls various devices connected to a system bus 104.

Figure 4:
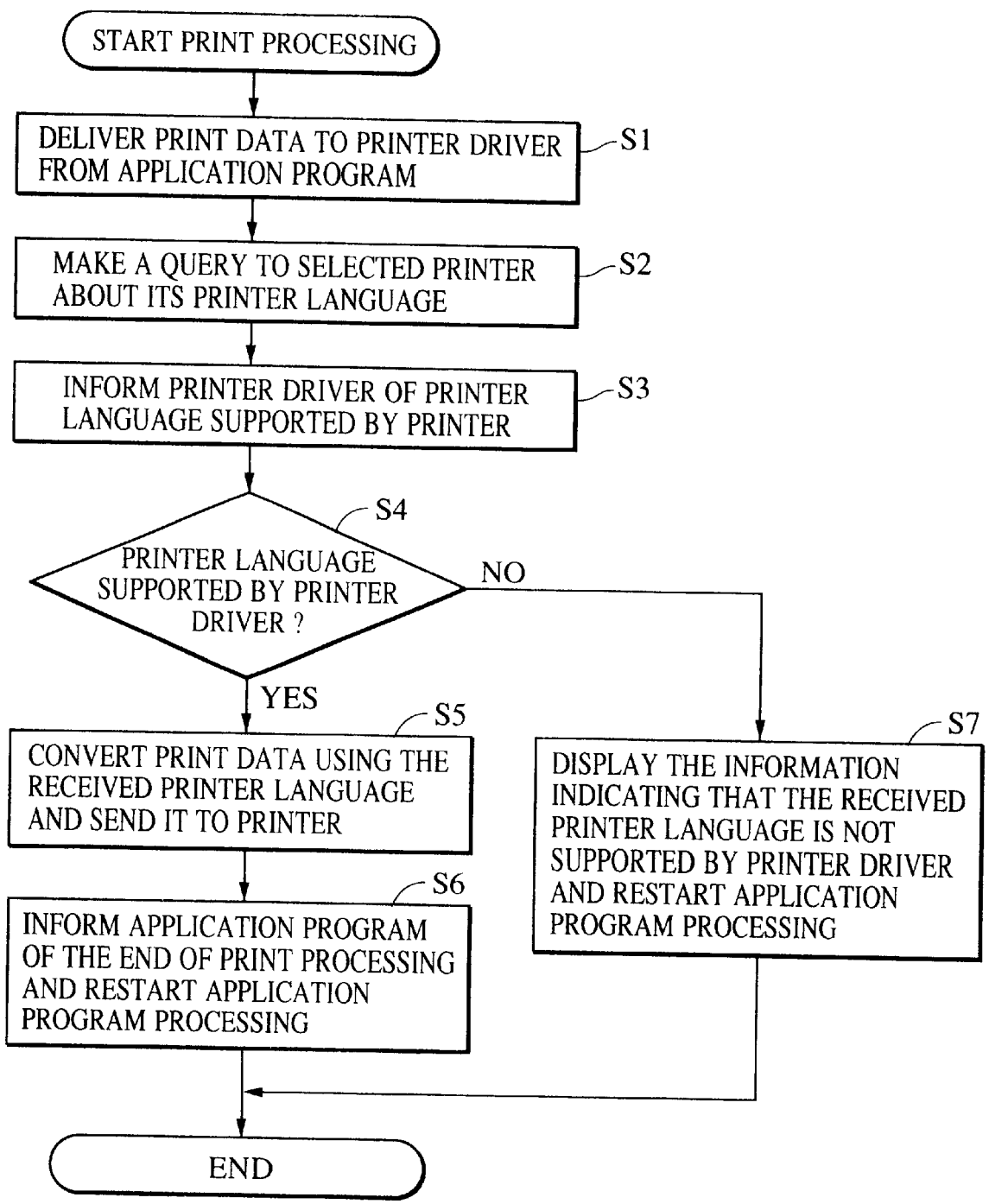
FIG. 4 is a flow chart illustrating print processing according to the first embodiment of the present invention.
Figure 5:
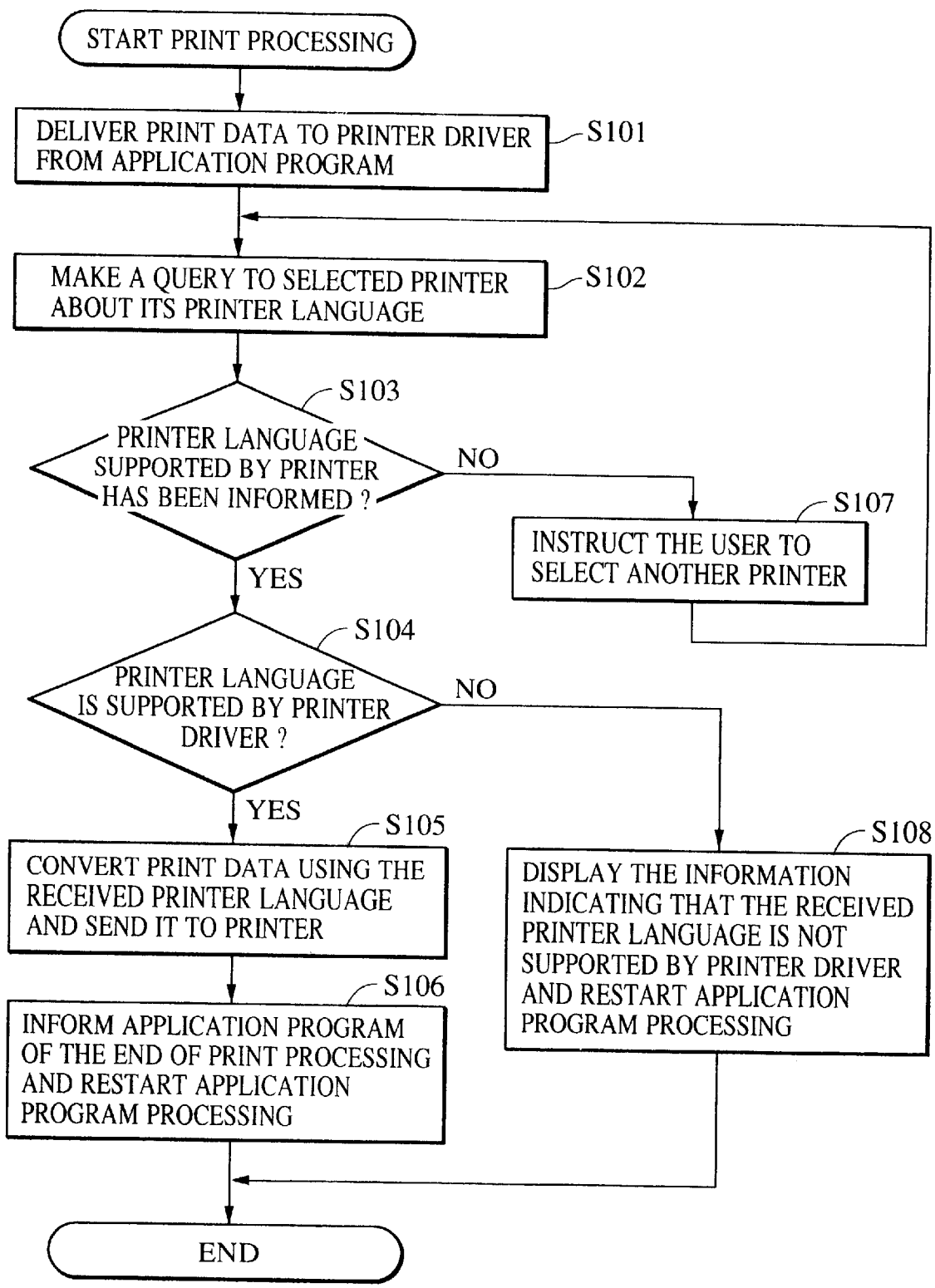
FIG. 5 is a flow chart illustrating print processing according to the second embodiment of the present invention.
Figure 6:
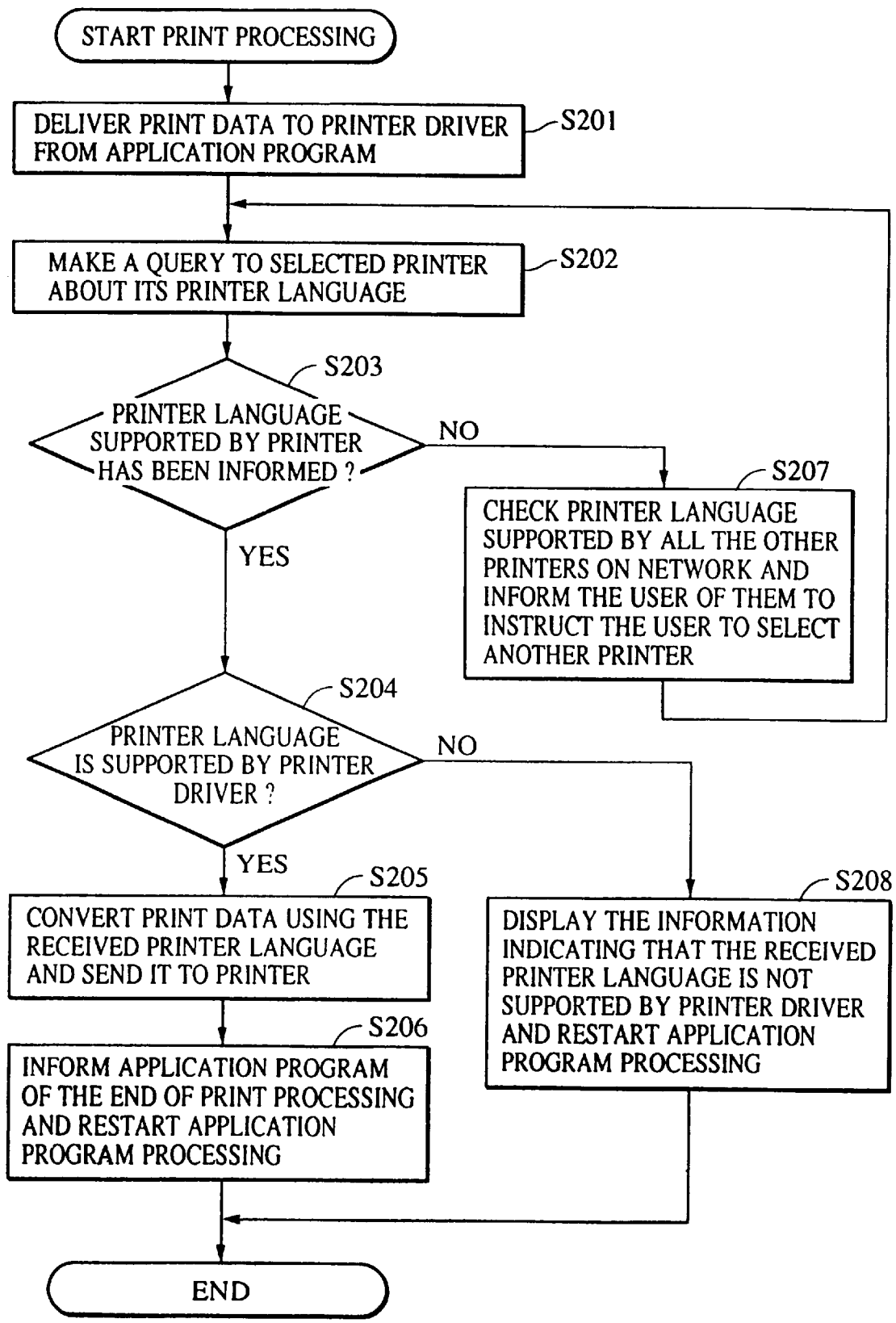
FIG. 6 is a flow chart illustrating print processing according to the third embodiment of the present invention.

A program ROM contained in a ROM 103 stores command information for running control programs, as illustrated by the flow charts of FIGS. 4, 5 and 6, executed in the CPU 101. Font data used in the above-described document processing is stored in a font ROM; and various data (for example, template data) is stored in a data ROM. The RAM 102 serves as a main storage device and a work area for the CPU 101.

A keyboard controller (KBC) 105 controls inputs from a keyboard 110 and from a pointing device (not shown). A CRT controller (CRTC) 106 controls the display of a CRT display (CRT) 111. The disk controller (DKC) 107 controls access to and from the external memory 112, such as a hard disk (HD) or a floppy disk (FD), which stores boot programs, application programs, printer driver programs, font data, user files, edit files, etc.

An external input/output interface 108 serves as an interface through which the printers 200, 300 and 400 are controlled via an external input device 113 and the network 600. A printer controller (PRTC) 109 equivalent to the aforedescribed printer driver serves the function of transmitting to the network 600 a print job indicated by a printer language corresponding to a printer selected among the printers 200, 300 and 400 by an application program.

Figure 3:
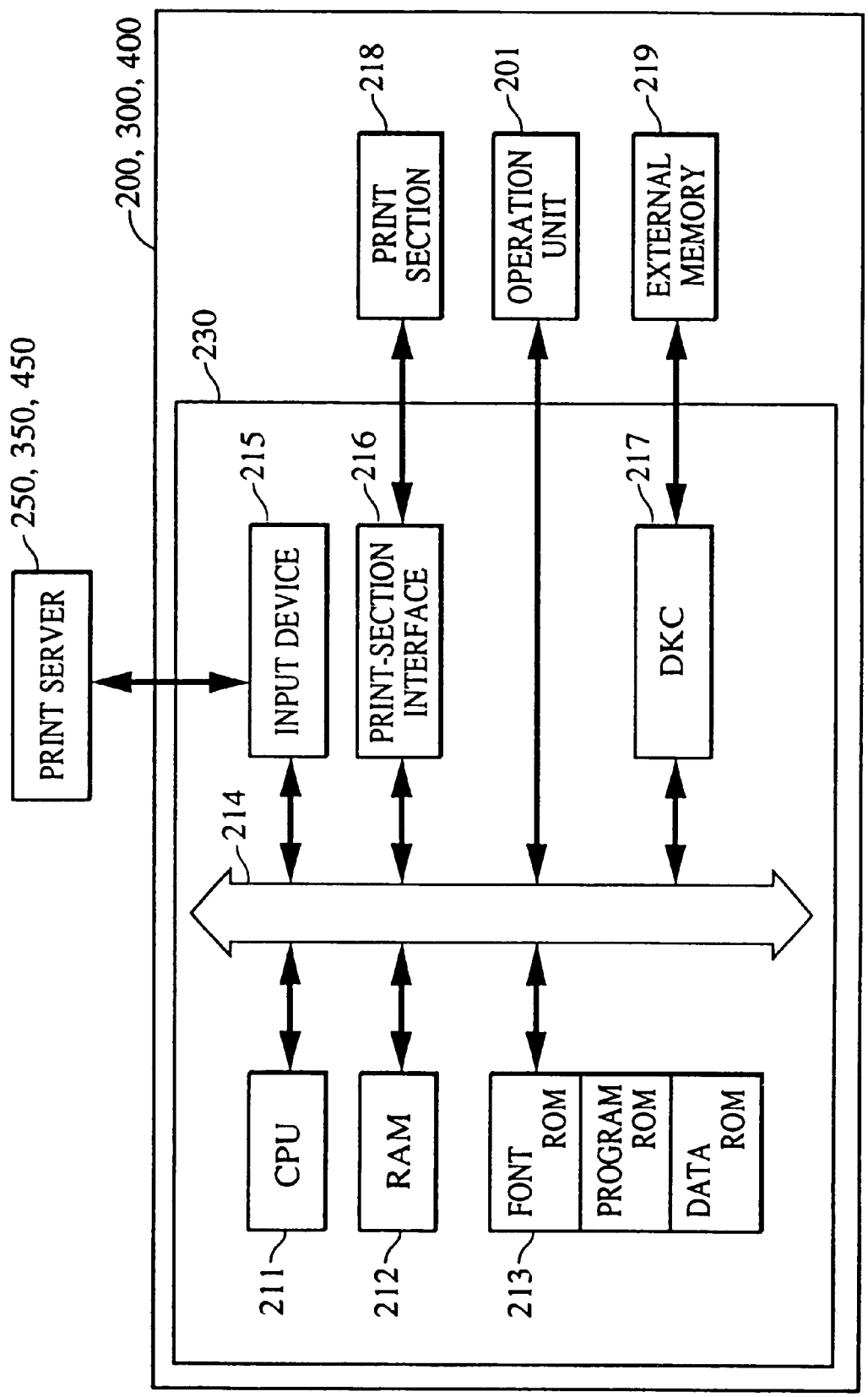
FIG. 3 is a block diagram of the schematic configuration of the printer shown in FIG. 1.

FIG. 3 is a block diagram illustrating the schematic configuration of each of the printers 200, 300 and 400. In the first through third embodiments, laser beam printers (LBP) are used as the printers 200, 300 and 400. However, other types of printers, such as bubble-jet printers and ink-jet printers, may be used as long as they have sufficient memory capacity to develop print data to a dot image and perform printing operations based on a predetermined printer language.

Contained in the printers 200, 300 and 400 shown in FIG. 3 is a printer control unit 230 for controlling the overall LBPs 200, 300 and 400 and also for analyzing character information received from the print servers 250, 350 and 450. A printer CPU 211 exercises overall control, based on control programs stored in a program ROM of a ROM 213, of access to and-from various devices connected to a system bus 214 so as to output an image signal as output information to a print section (printer engine) 218 connected to the system bus 214 via a print-section interface 216. The control programs and other programs run by the CPU 211 are stored, as described above, in the program ROM of the ROM 213. Font data used for generating the above output information is stored in a font ROM; and information used by the print servers 250, 350 and 450 is stored in a data ROM if a printer without an external memory 219, such as a hard disk, is employed.

The CPU 211 is constructed to inform the print servers 250, 350 and 450 of the information contained in the corresponding printers 200, 300 and 400 via an input device 215. A RAM 212, which functions as a main storage device and a work area for the CPU 211, and its memory capacity is expandable by the use of an option RAM connected to an add-in port (not shown). The RAM 212 is used as an output-information expansion area, an environment-data storage area, an a non-volatile RAM (NVRAM), or the like. A disk controller (DKC) 217 controls access to and from the above-described external memory 219, such as a hard disk (HD) or an IC card. The external memory 219 is removably connected as an option and stores font data, emulation programs, form data, etc. An operation unit 201 contains various types of operation switches and LED displays.

The number of the aforedescribed external memory 219 is not restricted to one, and a plurality of external memories 219 may be provided, connectable to a plurality of option cards in addition to built-in fonts. The external memory 219 may be provided with an NVRAM (unillustrated) to store printer-mode setting information received from the operation unit 201.

The file server 500 is similar to the client computer 100 in its internal configuration as illustrated in FIG. 2. The file server 500 manages the network 600 by storing files used in the network 600 in a hard disk (not shown). Moreover, the print queues 550 associated with the printers 200, 300 and 400 are formed on the hard disk to temporarily store print jobs received from the client computer 100 in the file format. More than one hard disk and one disk controller 217 may be provided to ensure the reliability of the network 600.

The internal configurations of the print servers 250, 350 and 450 are also similar to the construction of the client computer 100 shown in FIG. 2. If there is any print data stored in the print queues 550, the print servers 250, 350 and 450 respectively extract the print jobs using the external input device 113 and respectively send the print data to the printers 200, 300 and 400 through printer cables connected to the printer controller (PRTC) 109. Computers are not necessarily used as print servers 250, 350 and 450, and mere print server functions may suffice. Alternatively, the print servers 250, 350 and 450 may be built into the corresponding printers 200, 300 and 400.

An explanation will now be given of the print processing in the first embodiment with reference to the flow chart of FIG. 4. In this embodiment, the program for executing print processing by the CPU 101 is contained in the printer driver program, which is stored in a storage medium, i.e., a floppy disk, through which the program is readable by the computer. This program is then stored in an external memory, such as a hard disk. Alternatively, it may be stored in advance in the program ROM of the ROM 103 contained in the client computer 100.

A storage medium for supplying program codes may use not only the above-described floppy disk or the ROM, but also an optical disk, a magneto-optical disk, a hard disk, a CD-ROM, magnetic tape, a non-volatile memory card, or the like. With this arrangement, the program codes per se read from the storage medium can implement a novel feature of the present invention, and thus, the storage medium for storing such program codes can constitute the present invention.

A reference will first be made to FIG. 4. In SI, the CPU 101 of the client computer 100 runs an application program to generate data to be printed and stores it in the RAM 102 and in a hard disk. The CPU 101 then suspends the processing of the application program and executes the processings in S2 and the following steps. More specifically, the CPU 101 runs a printer driver program and makes a query about the printer language supported by the printer selected from the printers 200, 300 and 400 connected to the network 600 for performing a printing operation. This query may be made to any of the corresponding printer, the print server, or the file server 500. It will now be assumed in this embodiment that the printer selected for performing a printing operation will be the printer 200. In S3, in response to the question asked in S2, the CPU 101 receives a reply concerning the printer language supported by the printer 200 from the printer 200, the print server 250 or the file server 500.

Then, the CPU 101 determines in S4 whether the received printer language is contained in the printer languages supported by the printer driver. If the answer in S4 is yes, the flow proceeds to S5 in which the CPU 101 converts the print data according to the printer language supported by the printer 200 so that the printer 200 can interpret the data, and sends the converted data to the printer 200. In S6, the CPU 101 ends the printer driver program and restarts the processing of the application program.

On the other hand, if it is found in S4 that the printer language supported by the printer 200 is not included in the printer languages supported by the printer driver, the flow proceeds to S7 in which the CPU 101 displays a message indicating the above information on the display and ends the printer driver program and restarts the processing of the application program.

In this manner, in the first embodiment, a query is made concerning the printer language of the selected printer to the printer, the associated print server or the file server, and, upon receiving the answer, the print data is sent in the form of the obtained printer language. Thus, the user is able to perform a correct printing operation While the printer languages of the individual printers connected to the network are transparent to the user.

[Second Embodiment]

Print processing of a second embodiment of the present invention will now be described while referring to the flow chart of FIG. 5. In this embodiment, the program for executing print processing by the CPU 101 is contained in the printer driver program, which is stored in a storage medium, i.e., a floppy disk, through which the program is readable by the computer. This program is then stored in an external memory, such as a hard disk. Alternatively, it may be stored in advance in the program ROM of the ROM 103 contained in the client computer 100.

In this embodiment, if the printer language supported by a selected printer is not notified by the printer, the corresponding print server or the file server, the CPU 101 instructs the user to select another printer by displaying a message indicating such an instruction.

More specifically, in S101 the CPU 101 of the client computer 100 runs an application program to generate data to be printed and stores it in the RAM 102 and in a hard disk. Then, the CPU 101 suspends the processing of the application program and runs the printer driver program to control the processings in S102 and the following steps. In the interests of simplicity, in this embodiment, as well as in the previous embodiment, the flow of this processing will be explained, assuming that the printer selected for printing is the printer 200.

In S102, the CPU 101 makes a query about the printer language supported by the selected printer 200 to the printer 200, the print server 250 or the file server 500 on the network 600. The CPU 101 then determines in S103 as to whether the printer language supported by the printer 200 has been received, in response to the above query, from the printer 200, the print server 250 or the file server 500. If the answer in S103 is yes, the flow proceeds to S104 in which the CPU 101 judges whether the printer language is included in the printer languages which can be interpreted by the printer driver stored in the external memory 112. If the response in S104 is yes, the flow further proceeds to S105 in which the CPU 101 converts the print data to match the printer language supported by the printer 200 and sends the converted data to the printer 200. Thereafter, in S106 the CPU 101 ends the printer driver program and restarts the processing of the application program.

In contrast, if it is found by the CPU 101 in S104 that the printer language supported by the printer 200 is not interpretable by the printer driver program which executes the program, the flow proceeds to S108 in which the CPU 101 displays on the display that the printer language of the printer 200 is not supported by the printer driver. The CPU 101 then ends the printer driver program and restarts the application program.

Referring back to S103, if the CPU 101 judges that the printer language supported by the printer 200 has not been sent to the client computer 100 from the printer 200, the print server 250 or the file server 500, the CPU 101 instructs the user to select another printer from the printers 300 and 400 by displaying a message indicating the above instruction. Then, the flow returns to S102.

According to the above description, in the second embodiment, if the printer language is not obtained after making an inquiry about the printer language of the selected printer to the printer, the corresponding print server or the file server, a message is given to the user to indicate that another printer should be selected. This makes it possible for the user to recognize that the printer selected by the user is incorrect, thereby enhancing ease of use.

[Third Embodiment]

An explanation will now be given of print processing of a third embodiment with reference to the flow chart of FIG. 6. In this embodiment, the program for executing print processing by the CPU 101 is contained in the printer driver program, which is stored in a storage medium, i.e., a floppy disk, through which the program is readable by the computer. This program is then stored in an external memory, such as a hard disk. Alternatively, it may be stored in advance in the program ROM of the ROM 103 contained in the client computer 100. For the purpose of brevity, in this embodiment, as well as in the foregoing embodiments, it will now be assumed that the printer 200 is determined as the printer selected for printing.

In this embodiment, if the printer language supported by the printer 200 is not reported by the printer 200, the print server 250 or the file server 500, the printer languages of all of the other printers 300 and 400 on the network 600 are checked and notified to the user, so that the user can be instructed to choose another printer 300 or 400.

More specifically, in S201 the CPU 101 of the client computer 100 runs an application program to produce data to be printed and stores it in the RAM 102 and in a hard disk. The CPU 101 then suspends the processing of the application program and runs the printer driver program to control the processings in S202 and the following steps. Namely, in S202 the CPU 101 which runs the printer driver program inquires as to the printer language supported by the printer 200 to the printer 200, the print server 250 or the file server 500 connected to the network 600. Subsequently, the CPU 101 makes a determination in S203 whether the printer language supported by the printer 200 has been received, in response to the above question in S202, from the printer 200, the print server 250 or the file server 500.

If the response in S203 is yes, the flow proceeds to S204 in which it is judged as to whether the printer language is contained in the printer languages interpretable by the printer driver program. If the answer in S204 is yes, the flow further proceeds to S205 in which the print data is converted to match the printer language of the selected printer 200 and sends the converted data to the printer 200. Then, in S206 the CPU 101 ends the printer driver program and restarts the application program.

On the other hand, if the CPU 101 judges in S204 that the received printer language is not interpretable by the printer driver program, the flow proceeds to S208 in which the CPU 101 displays on the display that the printer language is not supported by the printer driver. The CPU 101 then ends the printer driver program and restarts the application program.

If it is found in S203 that the printer language supported by the printer 200 has not been reported by the printer 200, the print server 250 or the file server 500, the printer languages of all of the other printers 300 and 400 on the network 600 are checked and notified to the user. An instruction is then provided to the user to select another printer 300 or 400. The flow then returns to S202.

According to the above description, in this embodiment, if the printer language is not reported after an inquiry is made about the printer language supported by the selected printer to the printer, the print server or the file server, the CPU 101 instructs the user to select another printer by displaying the printer languages of all of the other printers connected to the network. It is thus possible for the user to perform a printing operation with a desired printer even if the printer languages of the individual printers connected to the network are totally unknown to the user.

As discussed above, according to this embodiment, a query is made concerning the printer language of the selected printer to the printer, the print server or the file server, and the print data is converted to match the received printer language and sent to the printer. This makes it possible to perform a correct printing operation while the printer languages of the individual printers connected to the network are transparent to the user.

[Fourth Embodiment]

Figure 7:
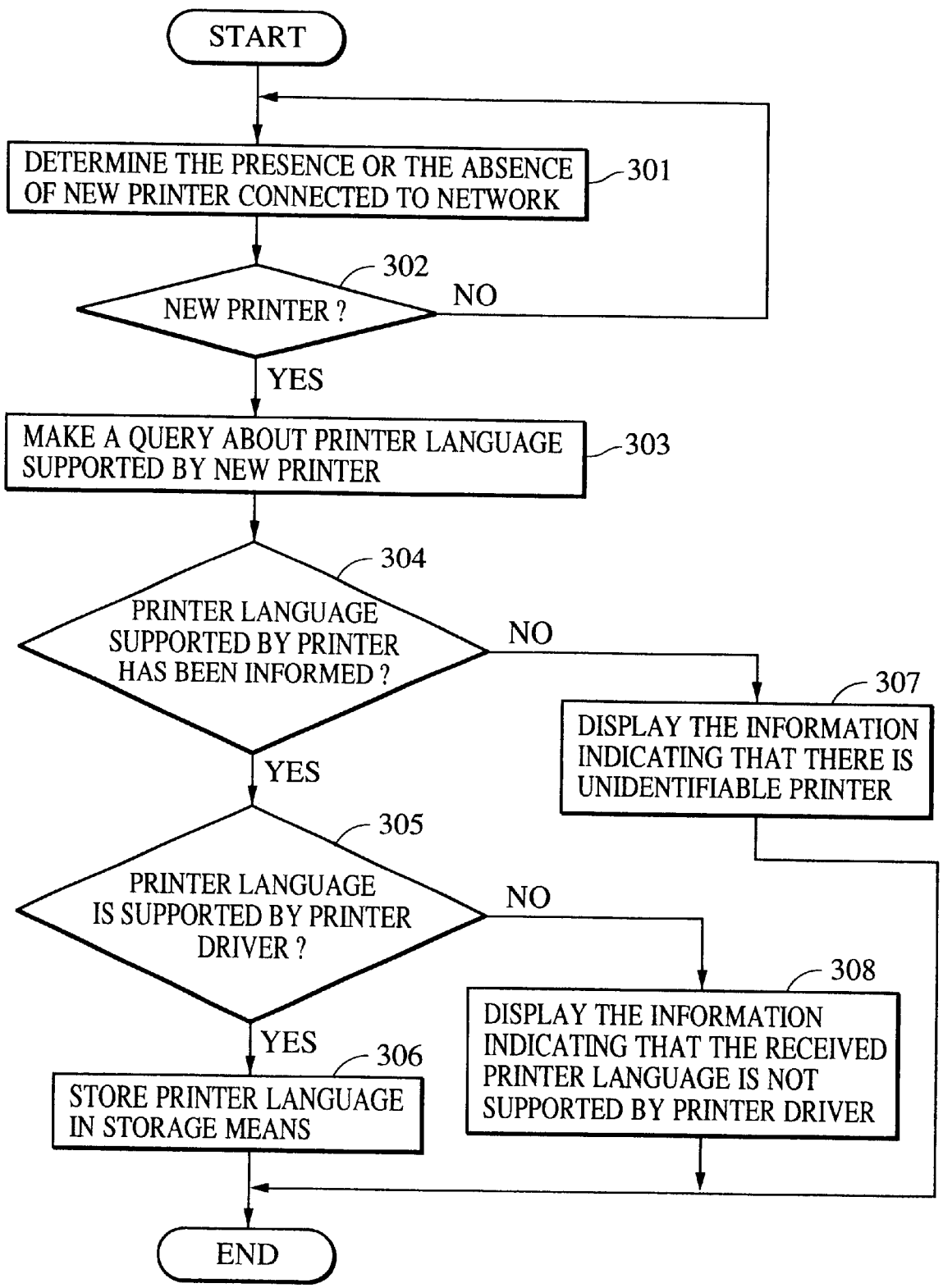
FIG. 7 is a flow chart illustrating print processing according to the fourth embodiment of the present invention.

A description will now be given with reference to the flow chart of FIG. 7 of print processing according to a fourth embodiment. In this embodiment, if a network printer is newly connected to a network, a client computer identifies the printer language supported by the new network printer.

More specifically, the client computer 100 identifies a network printer 700 (not shown) newly connected to the network 600 and inquires as to this printer 700 about its printer language. In this embodiment, the client computer 100 is adapted to store the devices, such as the print servers, the printer file server and the client computer, connected to the network 600 in the storage means, such as the RAM 102 or the external memory 112.

In S301, the CPU 101 of the client computer 100 determines the presence or absence of a new printer connected to the network 600 by inquiring about management information base (MIB) information to the network 600. If the CPU 101 identifies, upon a determination in S302, the presence of a new printer on the network 600, the flow proceeds to S303. If it is found in S302 that the presence of a new printer is denied, the flow returns to S301 by means such as providing a timer to count for a predetermined duration. Also, the processing in S301 may be executed only when the user gives a command instruction through the client computer 100.

In S303, the CPU 101 makes a query to the printer newly connected to the network 600, i.e., the printer 700 in this embodiment, about its printer language. It is then judged in S304 whether the printer language supported by the printer 700 has been sent in response to the above query. If the answer in S304 is yes, the flow proceeds to S305 in which a determination is made as to whether the received printer language is contained in the printer languages interpretable by the printer driver program. If the answer in S305 is yes, the flow further proceeds to S306 in which the CPU 101 stores the printer identifying information, such as the printer language supported by the printer 700, in the storage means, such as the external memory 112 or in the RAM 102 within the client computer 100. The CPU 101 then ends this processing.

In contrast, if it is found in S304 that the printer language supported by the printer 700 has not been sent in response to the question asked in S303, the CPU 101 displays in S307 on the display a message indicating the presence of an unidentifiable printer and then ends this processing.

If it is found in S305 that the received printer language is not interpretable by the printer driver program, the CPU 101 displays in S308 a message indicating such information on the display so as to end this processing.

According to the above description, in the fourth embodiment, the CPU 101 checks whether there is any printer newly connected to the network, and if the answer is yes, a query is made to the printer about its printer language. In response to this question, if it is determined that the received printer language is interpretable by the printer driver which executes this program, printer information, for example, the printer language, is stored in storage means within the client computer. This can obviate the need for the user to install a printer driver compatible with the new printer into the client computer.

As will be clearly understood from the foregoing description, the present invention offers the following advantages. Even if a printer is newly connected to a network, there is no need for the user to install a printer driver compatible with the new printer into all of the client computers on the network. Instead, the client computer can automatically determine whether a printer is newly connected to the network and further identify printer information, such as the printer language supported by the new printer, and store it in the client computer.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus connected to a network to which are also connected a plurality of printers and a server apparatus provided with a print queue, the server apparatus being one of a print server and a file server, said information processing apparatus comprising:

first inquiry means for making a first query to a first one of the plurality of printers concerning a printer language supported by the first printer;

transmission means for, when a first response identifying a printer language supported by the first printer in response to the first query is received by said information processing apparatus, transmitting to the first printer print data converted to be interpretable by the printer language identified by the first response;

second inquiry means for, when the first response is not received, making a second query to the remaining ones of the plurality of printers other than the first printer concerning what printer languages are supported by the remaining printers; and instruction means for providing an instruction to select one of the remaining printers based on a second response received from at least one of the remaining printers in response to the second query.

2. An information processing apparatus according to claim 1, wherein said first inquiry means makes a query to an additional printer when the additional printer is newly connected to the network.

3. An information processing apparatus according to claim 1, further comprising storage means for storing an identification of the printer language received in response to the first query made by said first inquiry means.

4. An information processing apparatus according to claim 1, further comprising distinguishing means for distinguishing when an additional printer is newly connected to the network, wherein said first inquiry means makes a query when the additional printer is newly connected to the network.

5. An information processing apparatus according to claim 4, further comprising storage means for storing an identification of the printer language received in response to the first query made by said first inquiry means.

6. An information processing apparatus according to claim 1, wherein said transmission means transmits via the print queue the print data.

7. An information processing apparatus according to claim 1, wherein said instruction means provides the instruction by displaying a message.

8. An information processing apparatus according to claim 7, wherein said instruction means provides the instruction by displaying a message indicating that another printer is to be selected.

9. An information processing apparatus according to claim 7, wherein said instruction means provides the instruction by displaying all of the printer languages supported by all of the printers connected to the network.

10. An information processing apparatus according to claim 1, wherein both the print server and the file server are connected to the network, said first inquiry means makes a query concerning the printer language to one of the plurality of printers selected to perform a printing operation, the print server and the file server.

11. An information processing method in an information processing apparatus connected to a network to which are also connected a plurality of printers and a server apparatus provided with a print queue, the server apparatus being one of a print server and a file server, said method comprising:

a first inquiry step of making a first query to a first one of the plurality of printers concerning a printer language supported by the first printer;

a transmission step of, when a first response identifying a printer language supported by the first printer in response to the first query is received by the information processing apparatus, transmitting to the first printer print data converted to be interpretable by the printer language identified by the first response;

a second inquiry step of, when the first response is not received, making a second query to the remaining ones of the plurality of printers other than the first printer concerning what printer languages are supported by the remaining printers; and an instruction step of providing an instruction to select one of the remaining printers based on a second response received from at least one of the remaining printers in response to the second query.

12. An information processing method according to claim 11, wherein said first inquiry step makes a query to an additional printer when the additional printer is newly connected to the network.

13. An information processing method according to claim 11, further comprising a storage step of storing an identification of the printer language received in response to the first query made in said first inquiry step.

14. An information processing method according to claim 11, wherein said instruction step provides the instruction by displaying a message.

15. An information processing method according to claim 14, wherein said instruction step provides the instruction by displaying a message indicating that another printer is to be selected.

16. An information processing method according to claim 14, wherein said instruction step provides the instruction by displaying all of the printer languages supported by all of the printers connected to the network.

17. An information processing method according to claim 11, wherein said first inquiry step makes a query, in the network having both the print server and the file server, concerning the printer language to one of the plurality of printers selected to perform a printing operation, the print server and the file server.

18. An information processing system including an information processing apparatus connected to a network to which are also connected a plurality of printers and a server apparatus provided with a print queue, the server apparatus being one of a print server and a file server, said information processing apparatus comprising:

first inquiry means for making a first query to a first one of the plurality of printers concerning a printer language supported by the first printer;

transmission means for, when a first response identifying a printer language supported by the first printer in response to the first query is received by said information processing apparatus, transmitting to the first printer print data converted to be interpretable by the printer language identified by the first response;

second inquiry means for, when the first response is not received, making a second query to the remaining ones of the plurality of printers other than the first printer concerning what printer languages are supported by the remaining printers; and instruction means for providing an instruction to select one of the remaining printers based on a second response received from at least one of the remaining printers in response to the second query.

19. An information processing system according to claim 18, wherein said first inquiry means makes a query to an additional printer when the additional printer is newly connected to the network.

20. An information processing system according to claim 18, said information processing apparatus further comprising storage means for storing an identification of the printer language received in response to the first query made by said first inquiry means.

21. An information processing system according to claim 18, said information processing apparatus further comprising distinguishing means for distinguishing when an additional printer is newly connected to the network, wherein said first inquiry means makes a query when the additional printer is newly connected to the network.

22. An information processing system according to claim 21, said information processing apparatus further comprising storage means for storing an identification of the printer language received in response to the first query made by said first inquiry means.

23. An information processing system according to claim 18, wherein said transmission means transmits via the print queue the print data.

24. An information processing system according to claim 18, wherein said instruction means provides the instruction by displaying a message.

25. An information processing system according to claim 24, wherein said instruction means provides the instruction by displaying a message indicating that another printer is to be selected.

26. An information processing system according to claim 24, wherein said instruction means provides the instruction by displaying all of the printer languages supported by all of the printers connected to the network.

27. A storage medium for storing a program readable by a computer, said program executing an information processing method in an information processing apparatus connected to a network to which are also connected a plurality of printers and a server apparatus provided with a print queue, the server apparatus being one of a print server and a file server, said method comprising:

a first inquiry step of making a first query to a first one of the plurality of printers concerning a printer language supported by the first printer; a transmission step of, when a first response identifying a printer language supported by the first printer in response to the first query is received by the information processing apparatus, transmitting to the first printer print data converted to be interpretable by the printer language identified by the first response;

a second inquiry step of, when the first response is not received, making a second query to the remaining ones of the plurality of printers other than the first printer concerning what printer languages are supported by the remaining printers; and an instruction step of providing an instruction to select one of the remaining printers based on a second response received from at least one of the remaining printers in response to the second query.

28. A storage medium according to claim 27, wherein said first inquiry step makes a query to an additional printer when the additional printer is newly connected to the network.

29. A storage medium according to claim 27, said method further comprising a storage step of storing an identification of the printer language received in response to the first query made in said first inquiry step.

30. A storage medium according to claim 27, wherein said instruction step provides the instruction by displaying a message.

31. A storage medium according to claim 30, wherein said instruction step provides the instruction by displaying a message indicating that another printer is to be selected.

32. A storage medium according to claim 30, wherein said instruction step provides the instruction by displaying all of the printer languages supported by all of the printers connected to the network.

33. A storage medium according to claim 27, wherein said first inquiry step makes a query, in the network having both the print server and the file server, concerning the printer language to one of the plurality of printers selected to perform a printing operation, the print server and the file server.

34. An information processing apparatus connected to a plurality of printers, comprising:

inquiry means for making a first query to a first printer concerning a printer language supported by the first printer; and control means for controlling said information processing apparatus to selectively perform one of plural operations in response to a result of the first query, a first one of the operations being to convert print data so as to be interpreted by the printer language supported by the first printer and to output such converted data to the first printer, and a second one of the operations being to cause said inquiry means to make a second query to a second printer on a network concerning a printer language supported by the second printer, wherein the second printer does not receive the first query.

35. An apparatus according to claim 34, further comprising output means for converting the print data so as to be interpreted by the printer language supported by the second printer and for outputting such converted print data to the second printer.

36. An apparatus according to claim 34, wherein said inquiry means makes a query when a printer is newly connected to said information processing apparatus.

37. An apparatus according to claim 34, further comprising storage means for storing information of the supported printer language in response to each inquiry by said inquiry means.

38. An apparatus according to claim 34, wherein said information processing apparatus is connected to a plurality of second printers.

39. An apparatus according to claim 38, further comprising instruction means for providing an instruction to select one printer from the plurality of second printers on the basis of a result of the second query.

40. An apparatus according to claim 39, wherein said instruction means provides an instruction to select a printer except the first printer by displaying a message.

41. An apparatus according to claim 40, wherein said instruction means provides an instruction to select another printer by displaying a message to select another printer.

42. An apparatus according to claim 40, wherein said instruction means provides an instruction to select another printer by displaying all printer languages which are supported by all printers connected to the network.

43. An apparatus according to claim 40, wherein said control means causes said inquiry means to make the second query to the second printer in an absence of any response to the first query being received from the first printer.

44. An information processing method operative in an information processing apparatus connected to a plurality of printers, comprising:

an inquiry step of making a first query to a first printer concerning a printer language supported by the first printer; and a control step of controlling the information processing apparatus to selectively perform one of plural operations in response to a result of the first query, a first one of the operations being to convert print data so as to be interpreted by the printer language supported by the first printer and to output such converted data to the first printer, and a second one of the operations being to cause said inquiry step to make a second query to a second printer on a network concerning a printer language supported by the second printer, wherein the second printer does not receive the first query.

45. A method according to claim 44, further comprising an output step of converting the print data so as to be interpreted by the printer language supported by the second printer and outputting such converted print data to the second printer.

46. A method according to claim 44, wherein said inquiry step makes a query when a printer is newly connected to the information processing apparatus.

47. A method according to claim 44, further comprising a storage step of storing information of the supported printer language in response to each inquiry by said inquiry step.

48. A method according to claim 44, wherein the information processing apparatus is connected to a plurality of second printers.

49. A method according to claim 48, further comprising an instruction step of providing an instruction to select one printer from the plurality of second printers on the basis of a result of the second query.

50. A method according to claim 49, wherein said instruction step provides an instruction to select a printer except the first printer by displaying a message.

51. A method according to claim 50, wherein said instruction step provides an instruction to select another printer by displaying a message to select another printer.

52. A method according to claim 50, wherein said instruction step provides an instruction to select another printer by displaying all printer languages which are supported by all printers connected to the network.

53. A method according to claim 50, wherein said control step causes said inquiry step to make the second query to the second printer in an absence of any response to the first query being received from the first printer.

54. A computer readable storage medium storing a program for executing an information processing method operative in an information processing apparatus connected to a plurality of printers, said method comprising: an inquiry step of making a first query to a first printer concerning a printer language supported by the first printer; and a control step of controlling the information processing apparatus to selectively perform one of plural operations in response to a result of the first query, a first one of the operations being to convert the print data so as to be interpreted by the printer language supported by the first printer and to output such converted data to the first printer, and a second one of the operations being to cause said inquiry step to make a second query to a second printer on a network concerning a printer language supported by the second printer, wherein the second printer does not receive the first query.

55. A medium according to claim 54, said method further comprising an output step of converting the print data so as to be interpreted by the printer language supported by the second printer and outputting such converted print data to the second printer.

56. A medium according to claim 54, wherein said inquiry step makes a query when a printer is newly connected to the information processing apparatus.

57. A medium according to claim 54, said method further comprising a storage step of storing information of the supported printer language in response to each inquiry by said inquiry step.

58. A medium according to claim 54, wherein the information processing apparatus is connected to a plurality of such second printers.

59. A medium according to claim 58, said method further comprising an instruction step of providing an instruction to select one printer from the plurality of second printers on the basis of a result of the second query.

60. A medium according to claim 59, wherein said instruction step provides an instruction to select a printer except the first printer by displaying a message.

61. A medium according to claim 60, wherein said instruction step provides an instruction to select another printer by displaying a message to select another printer.

62. A medium according to claim 60, wherein said instruction step provides an instruction to select another printer by displaying all printer languages which are supported by all printers connected to the network.

63. A medium according to claim 60, wherein said control step causes said inquiry step to make the second query to the second printer in an absence of any response to the first query being received from the first printer.

64. An information processing apparatus connected to a network to which are also connected a plurality of printers and a server apparatus provided with a print queue, the server apparatus being one of a print server and a file server, said information processing apparatus comprising:
   a first inquiry circuit arranged to make a first query to a first one of the plurality of printers concerning a printer language supported by the first printer;
   a transmitter arranged to, when a first response identifying a printer language supported by the first printer in response to the first query is received by said information processing apparatus, transmit to the first printer print data converted to be interpretable by the printer language identified by the first response;
   a second inquiry circuit arranged to, when the first response is not received, make a second query to the remaining ones of the plurality of printers other than the first printer concerning what printer languages are supported by the remaining printers; and
   a control circuit arranged to provide an instruction to select one of the remaining printers based on a second response received from at least one of the remaining printers in response to the second query.

65. An information processing apparatus according to claim 64, wherein said first inquiry circuit makes a query to an additional printer when the additional printer is newly connected to the network.

66. An information processing apparatus according to claim 64, further comprising a memory arranged to store an identification of the printer language received in response to the first query made by said first inquiry circuit.

67. An information processing apparatus according to claim 64, further comprising a distinguishing circuit arranged to distinguish when an additional printer is newly connected to the network, wherein said first inquiry circuit makes a query when the additional printer is newly connected to the network.

68. An information processing apparatus according to claim 67, further comprising a memory arranged to store an identification of the printer language received in response to the first query made by said first inquiry circuit.

69. An information processing apparatus according to claim 64, wherein said transmitter transmits via the print queue the print data.

70. An information processing apparatus according to claim 64, wherein said control circuit provides the instruction by displaying a message.

71. An information processing apparatus according to claim 70, wherein said control circuit provides the instruction by displaying a message indicating that another printer is to be selected.

72. An information processing apparatus according to claim 70, wherein said control circuit provides the instruction by displaying all of the printer languages supported by all of the printers connected to the network.

73. An information processing apparatus according to claim 64, wherein
   both the print server and the file server are connected to the network, and
   said first inquiry circuit makes a query concerning the printer language to one of the printer selected to perform a printing operation, the print server, and the file server.

74. An information processing system including an information processing apparatus connected to a network to which are also connected a plurality of printers and a server apparatus provided with a print queue, the server apparatus being one of a print server and a file server, said information processing apparatus comprising:
   a first inquiry circuit arranged to make a first query to a first one of the plurality of printers concerning a printer language supported by the first printer;
   a transmitter arranged to, when a first response identifying a printer language supported by the first printer in response to the first query is received by said information processing apparatus, transmit to the first printer print data converted to be interpretable by the printer language identified by the first response;
   a second inquiry circuit arranged to, when the first response is not received, make a second query to the remaining ones of the plurality of printers other than the first printer concerning what printer languages are supported by the remaining printers; and a control circuit arranged to provide an instruction to select one of the remaining printers based on a second response received from at least one of the remaining printers in response to the second query.

75. An information processing system according to claim 74, wherein said first inquiry circuit makes a query to an additional printer when the additional printer is newly connected to the network.

76. An information processing system according to claim 74, the information processing apparatus further comprising a memory arranged to store an identification of the printer language received in response to the first query made by said first inquiry circuit.

77. An information processing system according to claim 74,
wherein the information processing apparatus further comprises a distinguishing circuit arranged to distinguish when an additional printer is newly connected to the network, and
wherein said first inquiry circuit makes a query when the additional printer is newly connected to the network.

78. An information processing system according to claim 77, wherein the information processing apparatus further comprises a memory arranged to store an identification of the printer language received in response to the first query made by said first inquiry circuit.

79. An information processing system according to claim 74, wherein said transmitter transmits via the print queue the print data.

80. An information processing system according to claim 74, wherein said control circuit provides the instruction by displaying a message.

81. An information processing system according to claim 80, wherein said control circuit provides the instruction by displaying a message indicating that another printer is to be selected.

82. An information processing system according to claim 80, wherein said control circuit provides the instruction by displaying all of the printer languages supported by all of the printers connected to the network.

83. An information processing apparatus connected to a plurality of printers, comprising:
an inquiry circuit arranged to make a first query to a first printer concerning a printer language supported by the first printer; and
a controller arranged to control said information processing apparatus to selectively perform one of plural operations in response to a result of the first query, a first one of the operations being to convert print data so as to be interpreted by the printer language supported by the first printer and to output such converted data to the first printer, and a second one of the operations being to cause said inquiry circuit to make a second query to a second printer on a network concerning a printer language supported by the second printer, wherein the second printer does not receive the first query.

84. An apparatus according to claim 83, further comprising an output circuit arranged to convert the print data so as to be interpreted by the printer language supported by the second printer and to output such converted print data to the second printer.

85. An apparatus according to claim 83, wherein said inquiry circuit makes a query when a printer is newly connected to said information processing apparatus.

86. An apparatus according to claim 83, further comprising a memory arranged to store information of the supported printer language in response to each inquiry by said inquiry circuit.

87. An apparatus according to claim 83, wherein said information processing apparatus is connected to a plurality of second printers, and the second printer is one of the plurality of second printers.

88. An apparatus according to claim 87, further comprising a control circuit arranged to provide an instruction to select the second printer from the plurality of second printers based on a result of the second query.

89. An apparatus according to claim 88, wherein said control circuit provides an instruction to select a printer except the first printer by displaying a message.

90. An apparatus according to claim 89, wherein said control circuit provides an instruction to select another printer by displaying a message to select another printer.

91. An apparatus according to claim 89, wherein said control circuit provides an instruction to select another printer by displaying all printer languages which are supported by all printers connected to the network.

92. An apparatus according to claim 89, wherein said controller causes said inquiry circuit to make the second query to the second printer in an absence of any response to the first query being received from the first printer.

* * * * *

UNITED STATES PATENT AND TRADEMARK OFFICE
CERTIFICATE OF CORRECTION

PATENT NO. : 6,246,486 B1
DATED : June 12, 2001
INVENTOR(S) : Yoshinori Takahashi It is certified that error appears in the above-identified patent and that said Letters Patent is hereby corrected as shown below:

Column 3,
Line 21, "and-from" should read -- and from --.

Column 11,
Line 3, "printer;" should read -- printer; ¶ --.

Column 13,
Line 11, "the" (first occurrence) should be deleted.
Line 32, "such" should be deleted.

Signed and Sealed this

Eighteenth Day of February, 2003

JAMES E. ROGAN
*Director of the United States Patent and Trademark Office*